United States Patent
Petromanolakis E. et al.

(10) Patent No.: US 9,540,075 B2
(45) Date of Patent: Jan. 10, 2017

(54) VESSEL WITH A FLOW DEFLECTING HYDRODYNAMIC BOW FIN ARRANGEMENT

(71) Applicants: Emmanuel Petromanolakis E., Palaio Faliro Attikis (GR); Kalomoira Petromanolakis E., Palaio Faliro Attikis (GR); Evagelos Petromanolakis E., Palaio Faliro Attikis (GR)

(72) Inventors: Emmanuel Petromanolakis E., Palaio Faliro Attikis (GR); Kalomoira Petromanolakis E., Palaio Faliro Attikis (GR); Evagelos Petromanolakis E., Palaio Faliro Attikis (GR)

( * ) Notice: Subject to any disclaimer, the term of this patent is extended or adjusted under 35 U.S.C. 154(b) by 0 days.

(21) Appl. No.: 14/651,683

(22) PCT Filed: Dec. 12, 2013

(86) PCT No.: PCT/GR2013/000061
§ 371 (c)(1),
(2) Date: Jun. 12, 2015

(87) PCT Pub. No.: WO2014/091259
PCT Pub. Date: Jun. 19, 2014

(65) Prior Publication Data
US 2015/0344106 A1     Dec. 3, 2015

(30) Foreign Application Priority Data

Dec. 12, 2012   (GR) .............................. 20120100643

(51) Int. Cl.
*B63B 1/24*     (2006.01)
*B63B 1/26*     (2006.01)
(Continued)

(52) U.S. Cl.
CPC . *B63B 1/34* (2013.01); *B63B 1/40* (2013.01); *Y02T 70/125* (2013.01)

(58) Field of Classification Search
CPC .............. B63B 1/00; B63B 1/06; B63B 1/063; B63B 1/16; B63B 1/18; B63B 1/20; B63B 1/24; B63B 1/242; B63B 1/26; B63B 1/28; B63B 1/285; B63B 1/30; B63B 1/32; B63B 1/322; B63B 1/34; B63B 1/36; B63B 1/38; B63B 1/40; B63B 2001/00; B63B 2001/16; B63B 2001/18; B63B 2001/20; B63B 2001/24; B63B 2001/28; B63B 2001/32; B63B 2001/34; B63B 2001/38
(Continued)

(56) References Cited

U.S. PATENT DOCUMENTS 1,258,554 A * 3/1918 Furness ..................... B63B 1/38
                                                                114/67 R
1,859,139 A * 5/1932 Hanlon ..................... B63B 1/06
                                                                114/67 R
(Continued)

FOREIGN PATENT DOCUMENTS

| | | |
|---|---|---|
| DE | 102008006479 A1 | 7/2009 |
| GR | 20110100430 B | 9/2012 |
| WO | 96/26104 A | 8/1996 |

OTHER PUBLICATIONS

International search report Greek application 20120100643; Dated Mar. 18, 2014 with English translation.

*Primary Examiner* — Daniel V Venne (57) ABSTRACT

A vessel with a hydrodynamic duct for flow management at the bow thereof, a duct which as a pair of lateral walls (2, 3) with a hydrofoil section on either side of the bow connected with a horizontally oriented or inclined wall portion (1) with a hydrofoil section, the duct being displaceable in the vertical direction between positions (a) and (b) and contributing in the reduction of wave making and frictional resistances through differentiation of the flow within from the
(Continued)

flow outside the duct in cooperation with a bow which has longitudinally extending rectilinear or convex side walls (102, 103). The lateral walls (2, 3) have their trailing edge at a constant distance from the side walls (102, 103) of the bow, while they might for aesthetic reasons comprise movable hydrofoil section coverings (2', 3') or internal sheet laminates (20', 30') which protrude outwardly during navigation of the vessel and retract inwardly when the vessel is stationary in a port destination.

16 Claims, 10 Drawing Sheets

(51) Int. Cl.
*B63B 1/34* (2006.01)
*B63B 1/40* (2006.01)

(58) Field of Classification Search
USPC ......... 114/271–274, 278, 280, 282, 284, 288
See application file for complete search history.

(56) References Cited

U.S. PATENT DOCUMENTS

| | | | | |
|---|---|---|---|---|
| 2,139,594 | A * | 12/1938 | Kort | B63H 5/14 |
| | | | | 114/166 |
| 2,649,266 | A * | 8/1953 | Darrieus | B63B 1/24 |
| | | | | 102/374 |
| 2,767,678 | A * | 10/1956 | Vertens | B63B 1/24 |
| | | | | 114/274 |
| 3,302,603 | A * | 2/1967 | Eckert | B63B 1/063 |
| | | | | 114/61.26 |
| 5,046,444 | A * | 9/1991 | Vorus | B63B 1/248 |
| | | | | 114/274 |
| 5,566,634 | A | 10/1996 | Petromanolakis et al. | |
| 5,954,009 | A * | 9/1999 | Esmiol | B63B 1/32 |
| | | | | 114/274 |
| 9,205,892 | B2 * | 12/2015 | Petromanolakis | B63B 1/40 |
| | | | | 114/274 |

* cited by examiner

VESSEL WITH A FLOW DEFLECTING HYDRODYNAMIC BOW FIN ARRANGEMENT

THE FIELD OF ART

The present invention refers to the technical field of hydrodynamics and in particular it refers to a vessel provided with a hydrodynamic duct mounted at the bow thereof for the management of water flow during sailing, the duct being composed of two lateral walls, one on each side of the bow of the vessel, the two lateral walls being connected to a bottom wall portion that is horizontally oriented or at a certain inclination in relation to the horizontal, such duct defining a space of water flow at the bow of the vessel in the interior of the duct with diversified characteristics in relation to the flow in the exterior thereof, thereby resulting in a reduction of wave making and frictional resistances and as a consequent reduction of fuel consumption required for the propulsion of the vessel. In particular the invention is directed to propose solutions of functionally interdependent design for the hydrodynamic duct and for the configuration and geometry of the bow of the vessel so that it becomes possible to obtain in each particular case of different types of vessels an optimal result of the advantageous differentiation of the flow within the duct from the flow in the exterior thereof and thereby obtain an optimally reduced resistance to propulsion and as a consequent reduction in fuel consumption.

BACKGROUND OF THE INVENTION

In the field of shipbuilding, the reduction of energy consumption is becoming increasingly significant in view of the global economic crisis and the intensification of environmental problems.

One important factor that determines fuel requirements for the propulsion of a vessel is that of the wave making and frictional resistances it encounters. An ongoing attempt has thereby arisen to reduce such wave making and frictional resistances experienced by the vessels and afford an improvement in their propulsion through the solid mass of water they have to cross. By way of example, a bulb or ball configuration of the bow section of the hull has been widely used in the past to reduce wave making resistance and especially to reduce the height of the bow wave.

However, the frontal surface of the vessel, i.e. the surface area of the bow that comes in contact with water during propulsion of the vessel is an extensive area, and taking into account that the propulsion resistance is proportional to the square of the speed of the vessel, it follows that a correspondingly increased horsepower is required to overcome this resistance and provide propulsion of the vessel at the rated speed for which it has been designed.

WO-92/22456 (Petromanolakis Em.) has proposed a duct mounted at the bow of a vessel and extending at a height above and below the waterline thereof, such duct achieving a reduction of the wave making resistance during propulsion of the vessel as the vessel hits onto the water mass through the duct and not through the entire frontal surface thereof. Such a wave making resistance and energy consumption reducing duct has been optimized in subsequent patent applications wherein an increased differentiation of the flow through the duct in relation to the flow outside it has been attained.

In particular, WO-2013/011332 (Petromanolakis Em. et al) has disclosed a hydrodynamic duct mounted at the bow of a vessel, comprising a horizontal wall portion and two lateral wall portions, whereby the flow through the duct acquires substantially different characteristics from the flow outside it and thereby wave making and frictional resistances are reduced and the fuel conventionally required for the propulsion of the vessel is reduced accordingly. The duct is arranged with the Center of Low Pressure corresponding to a zero angle of attack onto the horizontal wall portion being located in the region of generation of the first bow wave and with the Centers of Low Pressure of the lateral wall portions in the region of connection thereof with the horizontal wall portion being located in a selected position between the Center of Low Pressure of the horizontal wall portion and up to or slightly forwardly the leading edge thereof. Further with a scope of overcoming drawbacks and deficiencies of the prior art structural design parameters of the stem hydrodynamic duct have been proposed that allow optimization of the performance of the duct. In particular selective combinations are being proposed in the manufacturing parameters of the horizontal wall portion and of the lateral wall portions of the duct, wherein those parameters in the geometry of the wall portions of the duct, which determine the lift coefficient $C_L$ and drag coefficient $C_D$ are being considered with a scope of obtaining optimization of the ratio $C_L/C_D$ for both the horizontal and for the lateral wall portions of the duct, as well as of obtaining optimization of the ratio of the lift coefficient $C_L$ of the horizontal wall to the lift coefficient $C_L$ of the lateral walls of the duct in correspondence with the specific nominal speed of propulsion of the vessel and the geometry of the bow.

It has however been observed that whilst the herein above proposed parametric design of the duct has led to significant improvements, such improvements having been confirmed through tests that have been carried out in models of different types of vessels (yachts, containers, bulk carriers and frigates) equipped with the hydrodynamic duct, the variation evident in the results obtained with the abovementioned different types of vessels has underlined the need of further work in the parametric design of the duct, wherein such design process is required to take into account the varying parameters of the configuration and of the geometry of each particular bow and further of the variable loading of the vessel, whereby the bow has to be designed in a manner such as to ensure optimal performance of the bow-duct combination thereby optimizing the eventual outcome of reduced horsepower requirements for the propulsion of the vessel and of reduced fuel consumption accordingly.

By way of example, whilst it has been found that the positioning of the duct at the bow of the vessel necessarily contributes to achieving an economically advantageous cruising, further also reducing the acceleration in the vertical movement of the bow thereby achieving a higher average speed of cruising, it is hereby considered that one reason for the differentiation of results obtained in the above tests is the diversity in the cooperation of the proposed duct with the vessel, as the flow exiting the duct impacts onto the sides of the bow and/or of the bulb, such impact creating obvious losses and contributing to the minimization of the beneficial effect of the duct.

Another reason for the differentiation in the continuity of the performance of the duct in the different tests that have been carried out is the varying loading condition of the vessel that differentiates the draught, i.e. the depth of immersion of the vessel in water, thereby changing the active range of the duct, such problem being particularly evident in container vessels wherein draught varies significantly in the extreme conditions of the ship without cargo and of the ship in a fully loaded condition.

It has also been observed that whilst the performance of the bulb in a vessel is satisfactory as long as the vessel travels at the nominal speed thereof and it is being reduced at lower speeds due to the concurrent change in Fn, the provision of the duct of the invention ensures a satisfactory performance also at speeds inferior than the designed nominal speed (economic speed) and at any Fn value whatsoever.

It is therefore a main object of the present invention to efficiently overcome the aforementioned drawbacks and deficiencies of the prior art and to propose structural design parameters of the hydrodynamic duct which will allow optimization of the performance thereof in conjunction with the functionally interdependent parameters of the configuration and geometry of the bow of the vessel, as well as with the varying loading conditions thereof.

It is therefore an object of the invention to provide a functional design of the bow of the vessel that is compatible with the installation of the hydrodynamic water flow management duct mounted thereupon with the waterlines being either rectilinear or convex rather than concave, always at a certain angle relative to the centerline of the vessel, so as to avoid the flow impacting onto a concave curvature of hollow curved sides of the bow and being entrapped therein, since such impacting and entrapping of the flow would undesirably contribute towards decelerating the vessel. A smooth flow at the outlet of the duct is therefore obtained with a rectilinear or convex rather than concave configuration of the bow sides and losses associated with the impacting of this flow onto the bow walls and/or onto the bulb are minimized.

Especially in ships fitted with a bulb, it is herein proposed a design that ensures coordination of the beneficial results of the bulb with the beneficial results of the duct in order to maximize cruising performance and minimize fuel consumption. It is in particular an object of the invention with particular application in vessels equipped with a bulb, to position the bulb in a manner such that the upper part thereof would be located not far beneath, but close to the load line and so that the stagnation point of the bulb would be located within the flow passing through the duct of the invention, wherein the proposed design contributes in the flow passing through the duct to influence all upwardly directed wave making vectors and some of the downwardly directed wave making vectors, thereby improving the flow at the sides of the vessel.

A further object of the invention is to propose the hydrodynamic water flow management duct at the bow of a vessel with a capacity of vertical movement so as to optimize the beneficial influence of the duct under varying conditions of draught of the vessel that depend on the loading thereof and on the consumption of consumables.

Another object of the invention is to propose the abovementioned vertically displaceable hydrodynamic water flow management duct at the bow of a vessel preferably provided with means that ensure its watertight abutment onto the side walls of the bow of the vessel thereby maintaining unaltered the characteristics of the flow within the duct. It is in particular an object of the invention to propose an embodiment with the duct mounted onto a plate covering the bow of the vessel, such plate extending in the longitudinal direction of the vessel and covering part or the entire length of the horizontal wall portion of the duct and moving together with the horizontal and the lateral walls of the duct thereby ensuring the watertight properties within the duct.

Another object of the invention for the case wherein the aforementioned plates covering the side walls of the bow are not provided, is to propose an alternative embodiment according to which the watertight abutment of the vertically displaceable horizontal wall portion of the duct onto the side walls of the bow is being achieved by using suitable sealing mechanisms, such as by way of example chambers being filled with air or other fluid medium or solid fixtures, made from rubber or other material, such chambers or solid fixtures or other types of means of watertight abutment being pushed towards the side walls of the bow, which are being installed either at the ends of the horizontal wall portion of the duct or at appropriate predetermined positions of the side walls of the bow and being actuated by hydraulic or pneumatic or mechanical or electrical mechanisms are being brought in a watertight abutment condition of the vertically displaceable horizontal wall portion of the duct onto the sides of the bow of the vessel. Similar sealing mechanisms for a watertight abutment can be used in the case where plates are employed for covering part of the length at the ends of the horizontal wall portion of the duct, whereby such sealing mechanisms are installed within the horizontal wall portion and are used to provide a watertight fitting onto the side walls of the bow for the remaining portion of the length of the horizontal wall portion extending beyond the length thereof that is covered by the plates.

Another object of the invention is to propose the horizontal wall portion of the abovementioned duct for the management of flow at the bow of a vessel provided with sheet metal plates or blades on either side thereof, such sheet metal plates or blades extending underneath the duct and converging towards the bow of the vessel, wherein these sheet metal plates or blades on either side of the horizontal wall portion contribute in the reduction of the stresses being exerted thereupon during the vertical movements of the bow due to sea waves.

It is another object of the invention to propose alternative arrangements of the horizontal wall portion of the hydrodynamic duct in relation to the bow of the vessel in order to optimize its performance In particular an object of the invention is to propose the hydrodynamic duct with an imaginary line passing through the leading edge of the horizontal wall portion thereof forming an angle (a) on either side of the axis of symmetry of the vessel and with an imaginary line passing through the trailing edge of the horizontal wall portion forming an angle (b) on either side of the axis of symmetry, i.e. the centerline of the vessel.

Another object of the invention is to propose an embodiment wherein the horizontal wall portion of the hydrodynamic duct extends in a direction parallel to or at a certain slope, upwardly or downwardly, relatively to the horizontal level of the waterline on either side of the axis of symmetry of the vessel.

Another object of the invention is to propose a suitable geometry of the lateral walls of the hydrodynamic duct in relation to the bow of the vessel and in conjunction with the aforementioned positions of the horizontal wall portion with a scope of optimizing the performance of the duct and in particular to propose the hydrodynamic duct with lateral walls formed so that the horizontal section thereof will follow the geometry and in particular the flare of the bow with the trailing edge of each horizontal section of the lateral walls being maintained at a constant equal distance from the side walls of the bow, such distance being defined by the perpendicular taken from the trailing edge of the lateral walls that corresponds to each particular waterline.

A further object of the invention is, mainly for aesthetic reasons which are particularly important design parameters for recreation vessels (yachts, etc.), but also in other types of vessels, to ensure conditions were in order not to adversely affect the aesthetics of the vessel, the lateral walls of the duct of the invention are located approximately at the height of the waterline of the vessel when it is stationary in the port and in order to achieve this result it is being suggested that a portion of these lateral walls is coated with a hydrofoil section with an analogous configuration or that these lateral walls are provided with appropriately shaped plate extensions, whereby the abovementioned hydrofoil sections or plate extensions can move, when the vessel leaves the port and cruises, by sliding along the vertical direction so that the lateral walls may under any circumstances be located sufficiently above the waterline level to ensure the desired differentiated flow conditions within the duct.

A further object of the invention serving the same aforementioned goal of aesthetics is to propose the duct of the invention comprising parts of or the entire lateral walls and/or of the horizontal wall portion being selectively made invisible, whereby the hidden part of the lateral walls and/or of the horizontal wall portion retract within the vessel and project outwardly thereof through appropriate driving mechanisms. It is in particular an object of the invention to propose a design of the hydrodynamic duct with parts or with the entire lateral walls encased within the vessel along the side walls of the bow and being adapted to move downwardly when they must be brought in operating condition, whereby they "snap" into recesses or protrusions of either the horizontally extending retractable portions of the horizontal wall portion or directly into the recesses or protrusions of the horizontal wall portion.

A further object of the invention is to provide additional one or more blades extending parallel to and underlying the horizontally oriented or inclined wall portion of the duct of the invention, such blades having the same or different hydrofoil section as the horizontally oriented or inclined wall portion of the duct, wherein the space provided in between the horizontally oriented or inclined wall portion and the underlying additional blade is either being covered or is not being covered by lateral blades, wherein the objective of the proposed additional one or more blades is the increase in the speed of the incoming flow to the duct of the invention and therefore the enhanced further diversification of the characteristics of flow within the duct from the flow outside the same.

An additional object of the invention is to provide a configuration of the horizontal wall portion of the duct with an arrangement of projections, which reinforce the profile of the horizontal wall portion and in addition act as guides for the projection of appropriate sheet laminates through slots of the horizontal blade, such sheet laminates extending forwardly the leading edge and/or rearwardly the trailing edge thereof when a further control of the vertical acceleration vectors of the flow is required and when the lift coefficient $C_L$ is sought to be suitably positioned in the resultant new geometry of the horizontal wall portion of the duct in order to optimize flow characteristics within the duct.

With the design parameters and combinations of the same proposed in the present invention, solutions are provided for the design of the hydrodynamic duct functionally interdependent with the design of the bow of the vessel whereupon it is being mounted, thereby achieving optimal advantageous differentiation of the flow characteristics within the duct from the flow outside it and accordingly obtain reduced wave making and frictional resistances during propulsion and a consequent reduction in horsepower requirements and in fuel consumption.

These and other objects, features and advantages of the present invention will become apparent in the detailed description of preferred embodiments.

BRIEF DESCRIPTION OF THE DRAWINGS

The invention will be fully disclosed to those skilled in the art by reference to the accompanying drawings in which it is being presented in an illustrative and non restrictive manner.

DETAILED DESCRIPTION OF PREFERRED EMBODIMENTS

Illustrative preferred embodiments of the invention will be presented hereinafter with reference to the accompanying drawings.

Figure 1A:
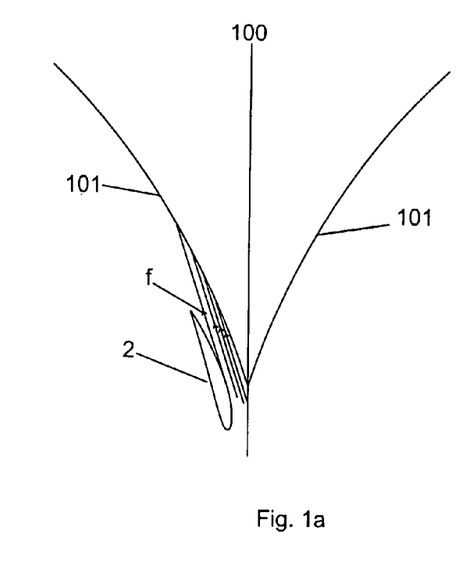
FIG. 1a shows an illustrative view of the water flow at the outlet of the duct of the invention, such flow suffering losses due to impact thereof onto the concave sides of the bow
Figure 1B:
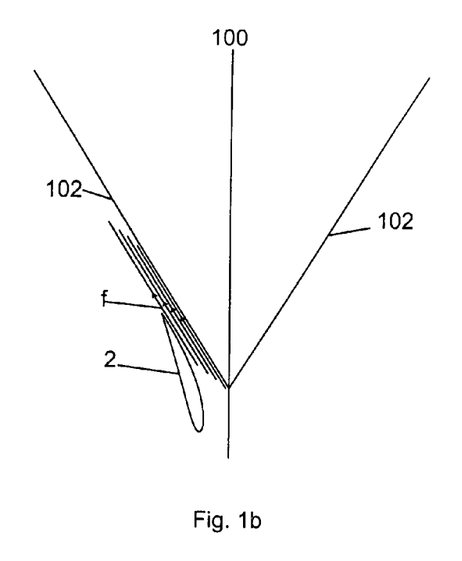
FIGS. 1b and 1c show an illustrative view of the water flow at the outlet of the duct of the invention, such flow subsequently flowing past bow sides having a rectilinear and a curved convex configuration respectively in accordance with preferred embodiments of the invention, the flow at the outlet of the duct being thereby normalized and smooth and flow losses being eliminated.
Figure 1C:
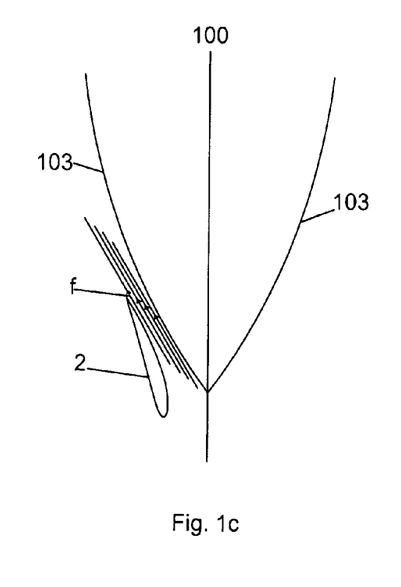

FIG. 1a shows an illustrative example of the application of the duct of the invention in a vessel whose bow is being formed with sidewalls 101 extending on either side of the axis of symmetry 100, wherein, due to the concave configuration of these side walls 101, losses are created and the beneficial effect of the duct is downgraded as the flow exiting the duct as depicted by vectors (f) impinges onto the hollow abovementioned side walls 101 of the bow. A similar result occurs when the output flow from the duct impinges onto inwardly curved sidewalls of a bulb. The solution to this problem is presented in FIGS. 1b and 1c wherein the bow is provided with either rectilinear walls 102 or convex walls 103 respectively and the water flow indicated by vectors (f) at the outlet of a lateral wall 2 of the duct of the invention is shown exiting parallel to the rectilinear side walls 102 (FIG. 1b) or convex side walls 103 (FIG. 1c) of the bow without impinging upon them. It is therefore obvious that an advantageous cooperation of the duct of the invention is ensured with a vessel having a bow configured with either rectilinear side walls 102 or curved side walls 103, but not with concave side walls 101.

Figure 2A:
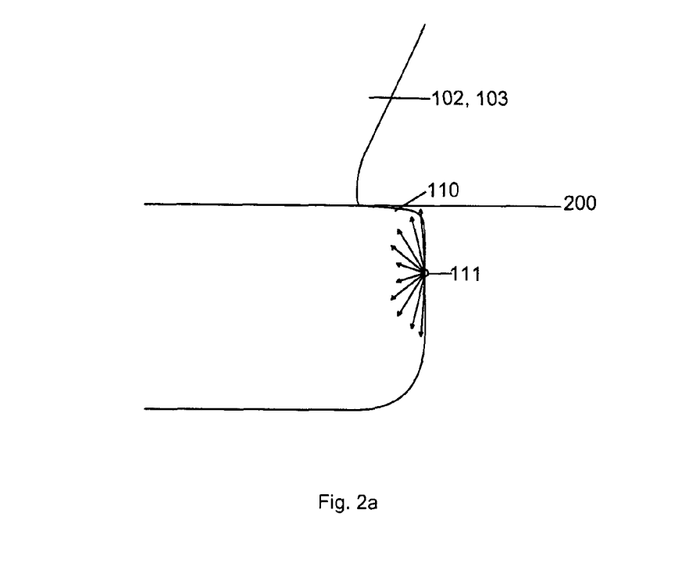
FIG. 2a shows an illustrative side view of the bow of a vessel provided with a bow bulb and FIG. 2b shows an illustrative frontal view of the bow of a vessel provided with a bulb and with the hydrodynamic duct of the invention.

The provision of a bulb installed at the frontal part of the hull has been widely used and has proven to contribute in reducing wave making resistance and in particular reducing the height of the bow wave for a specific draught (immersion) and designed speed. As illustratively shown in FIG. 2a, the bulb 110 at the front of a bow having rectilinear side walls 102 or convex side walls 103 is under any circumstances located underneath the waterline 200. A stagnation point 111 is indicated on such bulb 110, such stagnation point 111 being the point of zero velocity of the flow impinging thereupon.

Figure 2B:
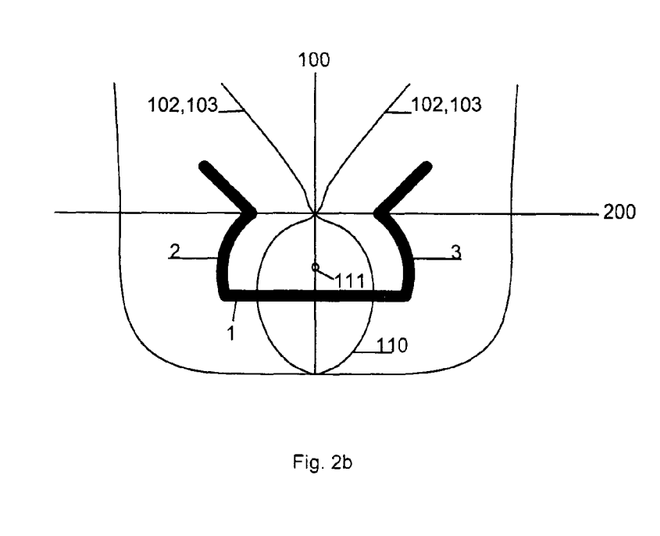

In order to design a vessel provided with a bulb and with the hydrodynamic duct of the invention it is hereby proposed to ensure the conditions that will provide an efficient coordination of the beneficial work of the bulb with the beneficial work of the hydrodynamic duct thereby maximizing cruising performance and minimizing fuel consumption. As indicatively shown in FIG. 2b depicting the duct of the invention applied at the bow of a vessel equipped with a bulb 110, the positioning of the bulb is such that its top is located not far below, but close to the load line, i.e. the waterline 200 and such that the stagnation point 111 of the bulb will be located within the flow stream passing though the duct of the invention, the latter comprising a horizontal wall 1 and lateral walls 2 and 3, such lateral walls 2, 3 being configured in a direction parallel to the side walls of the bulb 110 and thereafter parallel to the rectilinear side walls 102 or convex side walls 103 of the bow. The proposed design ensures the conditions for the flow passing through the duct to affect all wave making vectors with an upward direction and some of the wave making vectors with a downward direction, thereby improving the flow along the bow side walls.

As mentioned hereinabove in the introductory part, another reason for a varying performance of the duct of the invention is the variable loading condition of the vessel that changes the immersion of the vessel in water and thereby changes the effective range of the duct, wherein this problem is particularly evident in container ships and in other types of commercial ships wherein the immersion in water varies significantly between the extreme conditions of the vessel without cargo, the intermediately and the fully loaded vessel.

The aforementioned problem is being addressed by a hydrodynamic duct, which has the ability to move in the vertical direction so that under different conditions of draught of the vessel in water due to variable loading thereof and further due to varying consumption of its consumables, the hydrodynamic duct can provide a maximally beneficial performance. The movement of the hydrodynamic duct adapted to perform flow management at the bow of the vessel is preferably implemented with means that ensure a watertight mounting thereof onto the side walls of the bow so as to sustain constant values of the velocity vectors of the flow within the duct.

Specifically, as illustrated in the accompanying FIGS. 3a-3d, in a vessel with a typical conventional bow or with a bulb comprising longitudinally extending rectilinear side walls 102 or convex side walls 103 on either side of the central axis of symmetry 100 of the vessel, with bow surfaces extending vertically upwardly or at a certain slope (flare) relative to the vertical direction, the duct of the invention is arranged so as to afford a capacity of vertical displacement between an upper end position (a) and a lower end position (b) of the horizontal wall portion 1 thereof.

In the vertical movement of the duct between the aforementioned upper end position (a) and lower end position (b) of the horizontal wall portion 1 means may be employed that will ensure a watertight abutment of the horizontal wall 1 of the duct onto the side walls of the bow.

Figure 3A:
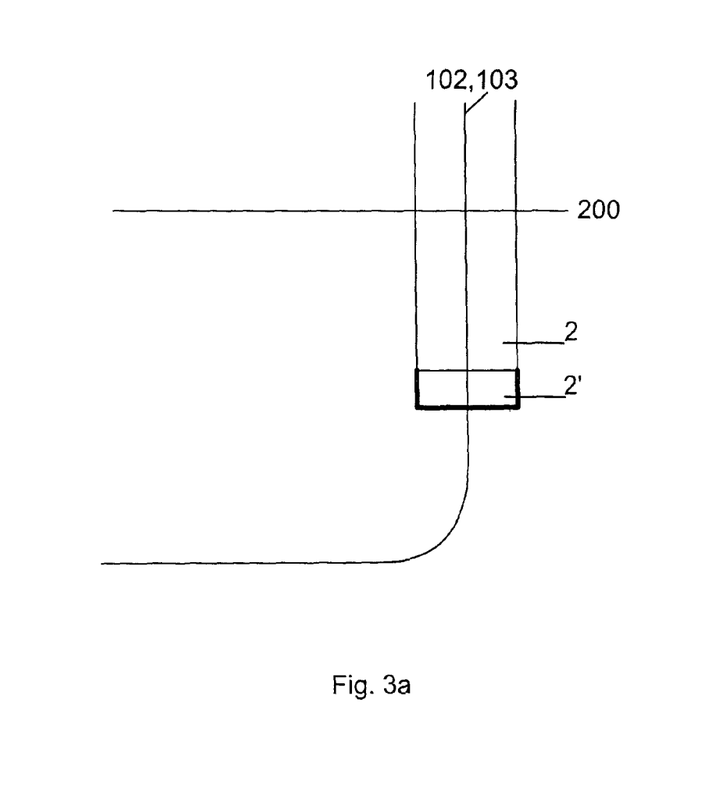
FIG. 3a shows a side view and FIG. 3b a frontal view of one half of the bow surface of a vessel and FIG. 3c shows a side view of a vessel equipped with a bulb whereupon is attached the hydrodynamic duct for the management of flow that is depicted in an illustrative perspective view, such duct being arranged so as to be free to move vertically with a scope of optimizing the beneficial work thereof under different draught (immersion of the vessel in water).
Figure 3B:
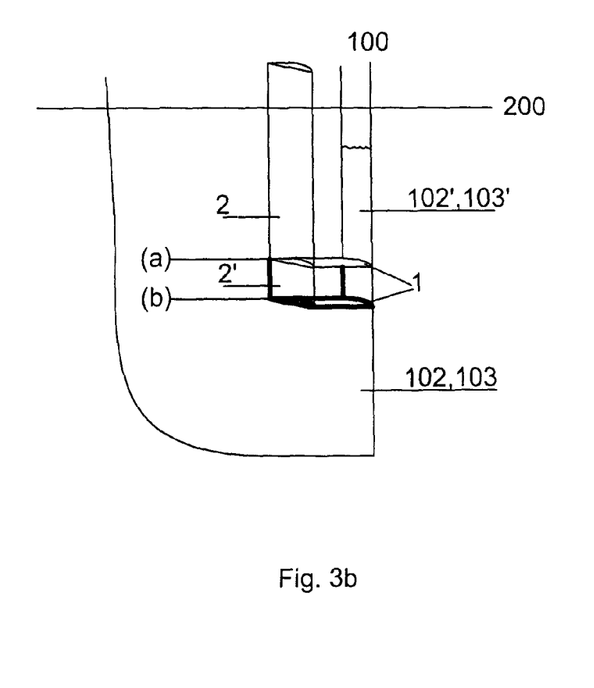
Figure 3C:
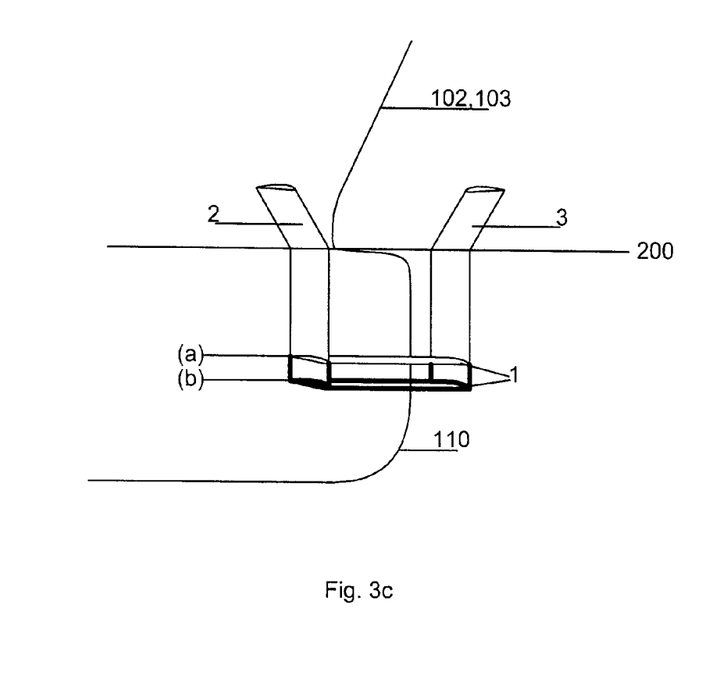

In accordance with a first preferred embodiment of the invention the abovementioned means of watertight abutment of the horizontal wall 1 of the duct onto the side walls of the bow, as shown in FIG. 3b, is the provision of plates covering both side walls of the bow of the vessel, which plates are indicated in the drawings by the reference numerals 102', 103' respectively corresponding to a bow with rectilinear or convex side walls 102, 103 extending in the longitudinal direction of the vessel and with no slope or with a certain flare relative to the vertical direction, wherein these plates 102', 103' cover the entire or part of the length of the duct in the longitudinal direction of the vessel and move together with the horizontal wall portion 1 and lateral walls 2, 3 of the duct ensuring a watertight fit thereof onto the side walls of the bow irrespective of the position it takes in the vertical direction in order to adapt to the varying conditions of draught, i.e. immersion of the vessel in water.

Figure 3D:
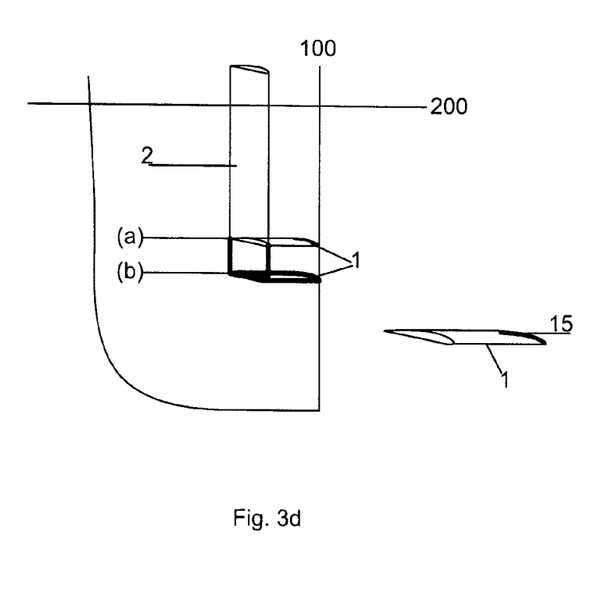
FIG. 3d shows the hydrodynamic duct for the management of flow at the bow of a vessel, the duct being provided with a capacity of vertical displacement with the horizontally oriented wall thereof being provided with chambers being filled with a fluid medium or with solid elastic elements through which a watertight mounting of the duct at the sides of the bow of the vessel is being effected.

According to another second preferred embodiment of the invention, the abovementioned means of watertight abutment of the horizontal wall 1 of the duct onto the side walls of the bow, as shown in FIG. 3d, is, instead of the provision of the abovementioned plates covering the sidewalls of the bow, the provision of the horizontal wall portion 1 with chambers filled with either air or other fluid medium to ensure a watertight fitting of the ends of the horizontal wall portion 1 onto the side walls of the bow as it moves in the vertical direction. Alternatively the ends of the horizontal wall portion 1 may be provided with other kinds of solid fixtures 15 or other sealing mechanisms being installed within the horizontal wall portion 1 and being driven by means of hydraulic or pneumatic or mechanical or electrical mechanisms with a scope of being brought at a condition of abutment onto the side walls of the bow of the vessel in any vertical position taken by the vertically displaceable horizontal wall portion 1 of the hydrodynamic duct.

It is hereby noted that in the case where the plates 102', 103' of the first embodiment hereinabove are employed for ensuring a watertight fitting of the duct onto the side walls of the bow and these plates do not cover the entire length, but part of the length at the ends of the horizontal wall portion 1, other watertight fitting mechanisms, such as the abovementioned solid fixtures 15 or other sealing mechanisms installed within the horizontal wall portion 1 may also be used to provide a watertight fitting onto the side walls of the bow for the remaining portion of the length of the horizontal wall portion 1 extending beyond the length thereof that is covered by the plates 102', 103'.

It is furthermore noted that the hereinabove mentioned means for the watertight fitting of the horizontal wall portion 1 to the bow, i.e. the chambers filled with air or other fluid medium or the solid fixtures 15 or other mechanisms might, instead of being installed at the ends of the horizontal wall portion 1 with a scope of abutment onto the side walls of the bow, be installed at the side walls of the bow and extend towards the horizontal wall portion 1 with a scope of abutment onto the ends thereof, such mechanisms being likewise driven by means of hydraulic or pneumatic or mechanical or electric mechanisms.

Figure 4A:
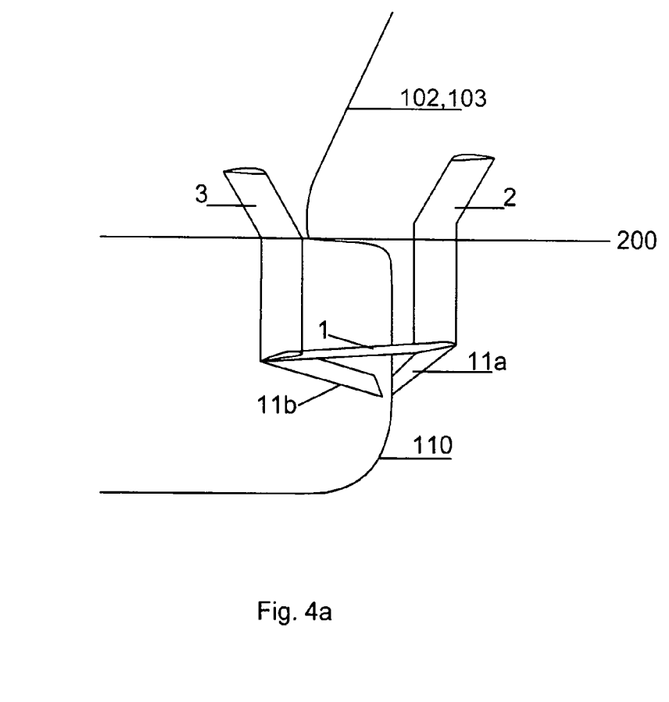
FIGS. 4a and 4b show a vessel provided with a bulb and a vessel with a conventional bow respectively with the hydrodynamic duct for flow management mounted thereupon, wherein the duct is provided with sheet metal plates or blades on either side thereof, such sheet metal plates or blades extending underneath the duct and converging towards the bow of the vessel.
Figure 4B:
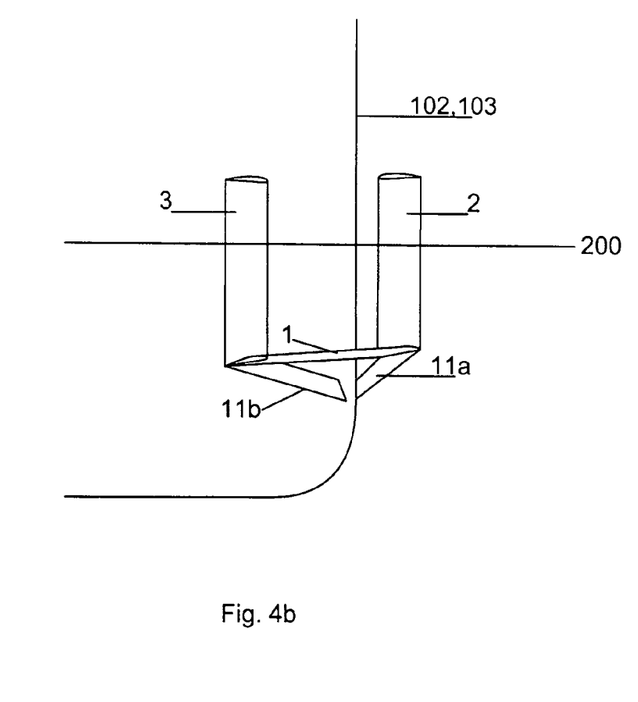

Hereinafter an illustrative layout of the hydrodynamic duct of the invention mounted onto a conventional bow (FIG. 4b) and a bow equipped with a bulb (FIG. 4a) is presented, wherein the horizontal wall portion 1 of the duct is provided with sheet metal plates or blades 11a, 11b on either side thereof, such sheet metal plates or blades extending underneath the duct and converging towards the bow of the vessel. These sheet metal plates or blades 11a, 11b provided on either side of the horizontal wall portion 1 contribute in the reduction of the stresses being exerted onto the horizontal wall portion 1 during the vertical movements of the bow due to sea waves and furthermore these sheet metal plates or blades 11a, 11b provide a differentiated flow stream that contributes in optimizing the flow within the duct, i.e. within the space being defined by the horizontal wall portion 1 and lateral walls 2, 3.

The present invention further seeks to provide appropriate positioning of the duct with alternative arrangements of the horizontal wall portion thereof in relation to the bow of the vessel in order to optimize its performance.

Figure 5:
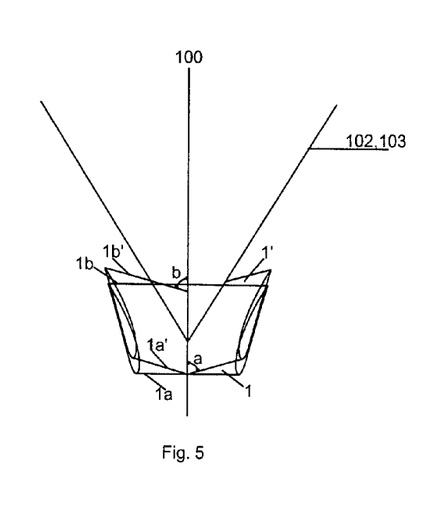
FIG. 5 shows another embodiment of the invention in which the horizontal wall portion of the duct extends perpendicularly to the axis of symmetry of the vessel and alternatively it extends so that an imaginary line passing through the leading edge of the horizontal wall portion forms an angle (a) on either side of the axis of symmetry of the vessel and that an imaginary line passing through the trailing edge of the horizontal wall portion forms an angle (b) on either side of the axis of symmetry of the vessel.

Thus, whereas in a first preferred embodiment of the invention, the horizontal wall portion 1 of the duct extends perpendicularly to the axis of symmetry of the vessel, i.e. with the imaginary line passing through the leading edge 1a of the horizontal wall portion perpendicular to the axis of symmetry 100 of the vessel and with the imaginary line passing through the trailing edge 1b of the horizontal wall portion also perpendicular to the axis of symmetry of the vessel, it is alternatively possible, as illustrated in FIG. 5, to have the horizontal wall portion 1 extending always along the same longitudinally provided horizontal plane, however so as to form an angle on either side of the axis of symmetry 100 of the vessel with an imaginary line passing through the leading edge 1a' of the horizontal wall portion forming an angle (a) on either side of the axis of symmetry of the vessel and with an imaginary line passing through the trailing edge 1b' of the horizontal wall portion forming an angle (b) on either side of the axis of symmetry of the vessel, wherein angle (a) may be equal to angle (b) or it may be different than angle (b).

Figure 6A:
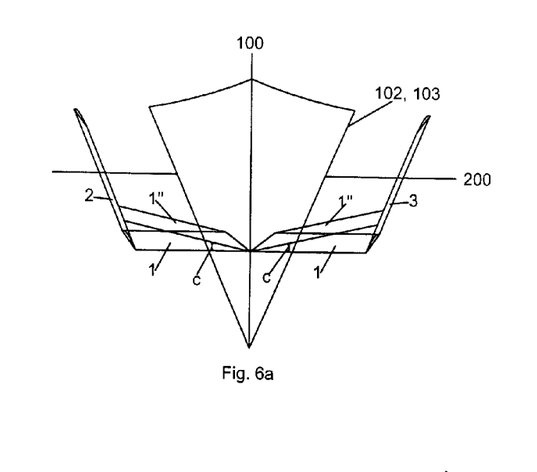
FIG. 6a shows an embodiment of the invention with the horizontal wall portion of the hydrodynamic duct extending at a certain upward inclination in relation to the horizontal level of the waterline on either side of the axis of symmetry of the vessel.
Figure 6B:
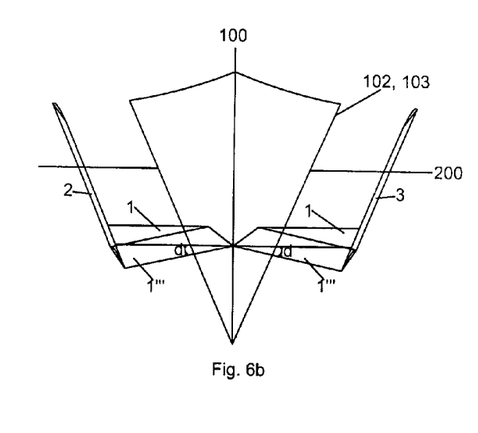
FIG. 6b shows another embodiment of the invention with the horizontal wall portion of the hydrodynamic duct extending at a certain downward inclination in relation to the horizontal level of the waterline on either side of the axis of symmetry of the vessel.

In accordance with another embodiment of the invention, the horizontal wall portion of the hydrodynamic duct of the invention extends at a certain inclination on either side of the axis of symmetry 100 of the vessel. Specifically, as illustrated in FIG. 6a, according to one embodiment of the invention, the horizontal wall portion 1" of the hydrodynamic duct extends at a certain inclination of an angle (c) upwardly with respect to the horizontal plane of the waterline 200 on either side of the axis of symmetry 100 of the vessel and, as illustrated in FIG. 6b, according to another embodiment of the invention, the horizontal wall portion of the hydrodynamic duct extends at a certain inclination of an angle (d) downwardly with respect to the horizontal plane of the waterline 200 on either side of the centerline 100 of the vessel.

It is further possible that the horizontal wall portion of the duct of the invention extends so as to form the angle illustrated in FIG. 5 on either side of the axis of symmetry 100 of the vessel with an imaginary line passing through the leading edge of the horizontal wall portion at a certain inclination of an angle (a) and with the imaginary line passing through the trailing edge of the horizontal wall portion at a certain inclination of an angle (b) relative to the axis of symmetry of the vessel, wherein each of the angles (a) or (b) may vary within a range of 10-170° and wherein the angle (b) may be equal to or different to angle (a), whilst at the same time the horizontal wall portion of the duct extends at a certain upward inclination (FIG. 6a) or a certain downward inclination (FIG. 6b) with respect to the horizontal plane of the waterline 200 on either side of the axis of symmetry 100 of the vessel.

Figure 7:
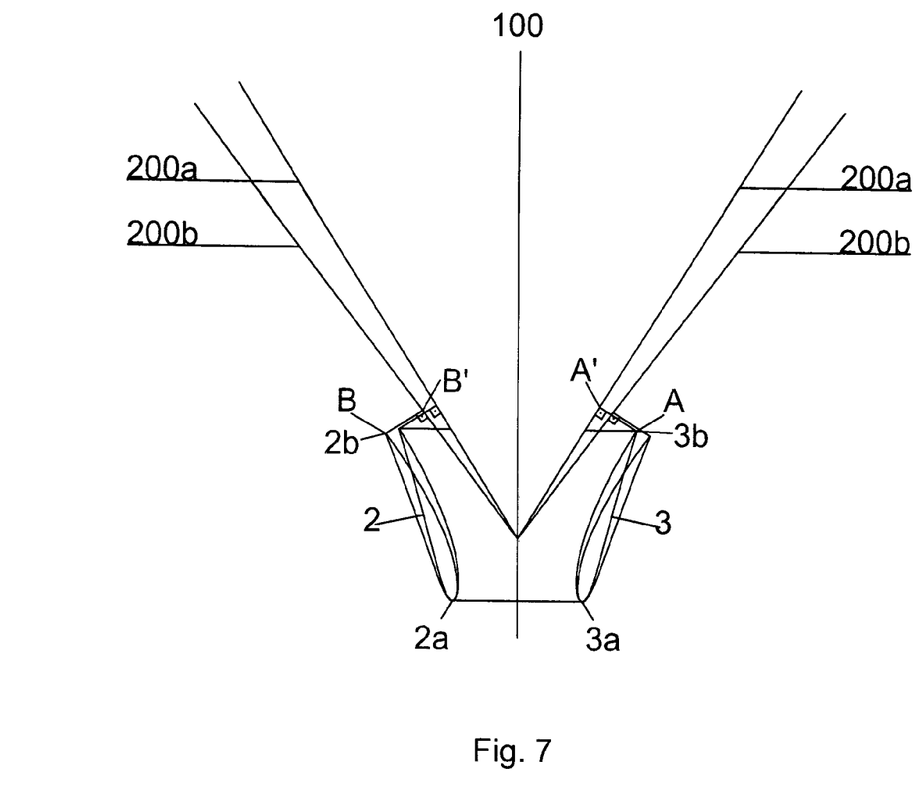
FIG. 7 shows the hydrodynamic duct arrangement in accordance with a preferred embodiment of the invention wherein the lateral walls of the duct are appropriately provided in such a position that in relation to any waterline whatsoever, the trailing edge of these lateral walls is maintained at a constant equal distance as measured along the perpendicular taken from the trailing edge to the vessel, which corresponds to the applicable waterline.

The present invention also contemplates the appropriate geometry of the lateral walls of the hydrodynamic duct in relation to the bow of the vessel and in conjunction with the aforementioned positions of the horizontal wall portion with a scope of optimizing the performance of the duct. Specifically, as shown in FIG. 7, the hydrodynamic duct of the invention is provided with lateral wall portions 2, 3 configured so that, in any position taken by the vertically displaceable horizontal plane passing through the waterline 200, the horizontal section of the lateral walls 2, 3 follows the geometry and in particular the flare of the bow with the trailing edge of each horizontal section of the lateral walls being maintained at a constant equal distance from the side walls of the bow, such distance being defined by the perpendicular taken from the trailing edge of the lateral walls that corresponds to each particular waterline. It is being particularly observed in FIG. 7 that for two different waterline levels 200a and 200b, the corresponding distance (AA') and (BB') of the trailing edges (2b, 3b) as measured along the perpendicular to the sides of the bow remains constant, i.e. that the two linear segments (AA') and (BB') are of the same length.

Figure 8A:
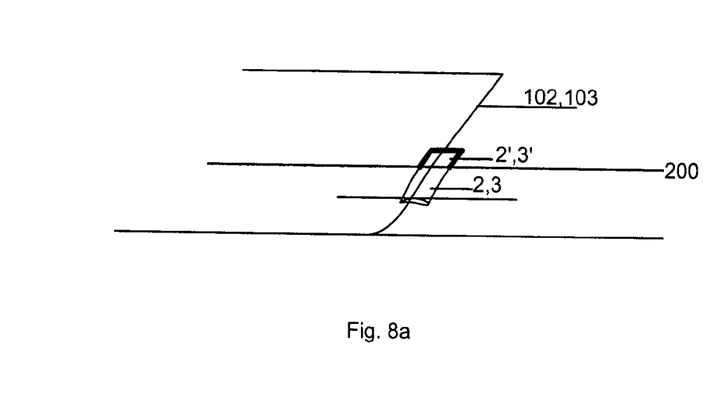
FIG. 8a shows a side view of a vessel provided with the duct of the invention wherein the lateral walls can slide vertically so as to lie close to, above or below the waterline, as long as the vessel is stationary in a port
Figure 8B:
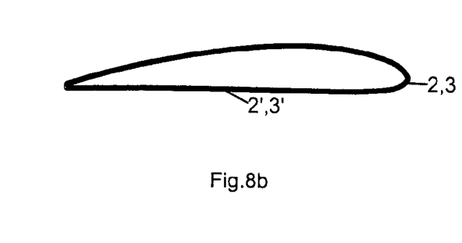
FIG. 8b is a cross sectional view of the lateral wall provided with a covering hydrofoil section.

According to another preferred embodiment of the invention that finds particular application in vessels in which aesthetics is a design parameter of particular importance, such as in recreation vessels (yachts, etc.), it is proposed that the lateral walls 2, 3 of the duct of the invention may move vertically so as to lie close to, above or below the waterline 200 as long as the vessel is stationary in a port (FIG. 8a). In accordance with one embodiment of the invention shown in FIG. 8b this result is obtained with hydrofoil sections 2', 3' having the appropriate dimensions and configuration so as to cover the lateral walls 2, 3 respectively, such hydrofoil sections 2', 3' being configured to vertically slide so that the lateral walls 2, 3 of the duct of the invention may lie close to, above or below, the waterline 200 as long as the vessel is stationary in a port.

Figure 8C:
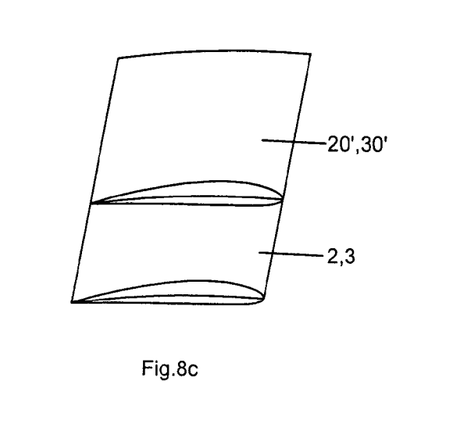
FIG. 8c shows an embodiment of the invention in which the lateral walls are provided with internal curved or linear sheet laminates, which protrude outwardly during navigation of the vessel and extend vertically above the lateral walls to ensure the differentiation of the flow within the duct.

In accordance with an alternative preferred embodiment of the invention shown in FIG. 8c, the lateral walls 2, 3 are respectively provided with internal curved or rectilinear sheet laminates 20', 30' which protrude outwardly during navigation of the vessel and extend vertically above the lateral walls to ensure the differentiation of the flow within the duct, whilst they retract inwardly as long as the vessel is stationary in a port to ensure compliance with aesthetic requirements.

A further object of the invention with a scope of serving the aforementioned aesthetic requirements is to propose the design of the duct of the invention with invisible parts or of the entire lateral and/or horizontal wall portions, wherein the hidden parts or entire lengths of the lateral and/or the horizontal walls are being configured so as to retract within the vessel and protrude outwardly thereof when required being driven by means of appropriate mechanisms so as to bring the hydrodynamic duct provided at the bow of the vessel at an appropriate position for the management of water flow at different altitudinal levels, as well as at variable draught of the vessel.

Figure 9A:
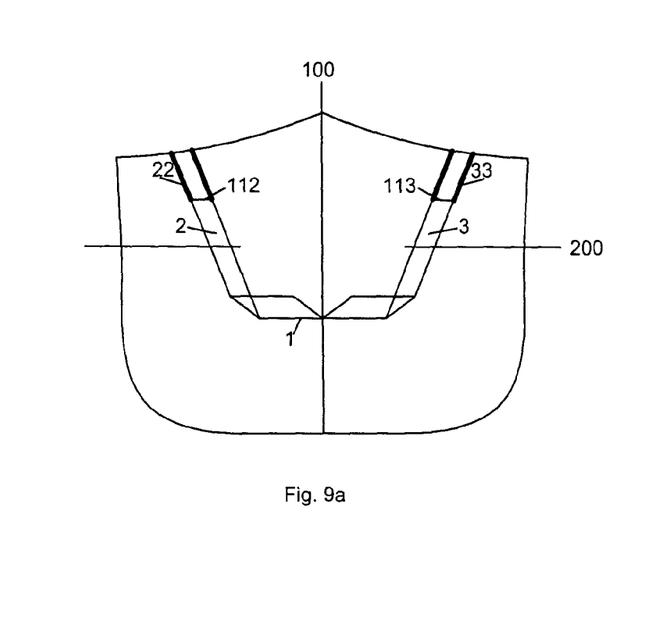
FIGS. 9a and 9b show a frontal bow view in the case of a conventional bow and of a bow equipped with a bulb respectively, wherein part or the entire length of the lateral walls and/or the horizontal wall of the duct of the invention are movable and retractable within appropriate slots in the vessel.

Specifically, as shown in FIG. 9a, depicting a frontal view of such a capacity of movement of the entire or part of the lateral and/or of the horizontal wall portions of the duct in the case of a vessel with a conventional bow configuration, wherein the side walls at each side of the bow comprise slots 112, 113 within which retract and through which protrude when necessary the lateral walls 2, 3 of the duct of the invention respectively. The lateral walls 2, 3 when projecting outwardly from the vessel comprise extensions 22, 33 respectively and when being brought in operating position extensions 22, 33 are desirably configured so as to lie approximately at the level of the waterline 200 and joined to the existing underlying fixedly mounted lateral walls 2, 3 of the duct. A corresponding slot is being provided for the retraction within the vessel or the extraction from the same of the horizontal wall portion 1, wherein this slot is not illustrated in FIG. 9a.

Figure 9B:
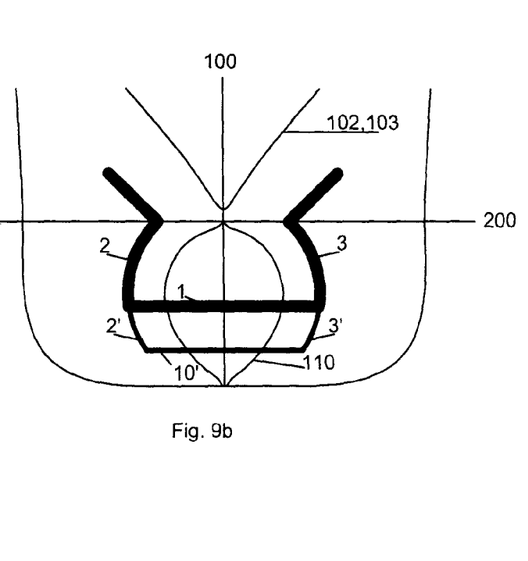

FIG. 9b shows a frontal view of a bow with such a capacity of movement of the entire or part of the lateral and/or of the horizontal wall portions of the duct in the case of a vessel with a bow provided with a bulb 110, wherein the lateral walls 2, 3 extend into extensions 2', 3' respectively, such extensions being connected by an additional horizontal element 10'. The extensions 2', 3' and the additional horizontal element 10' may be fixedly attached to the surface of the bulb 110, underneath the duct comprising the lateral walls 2, 3 and the horizontal wall portion 1 and they may desirably retract or protrude either each one of them separately or all together as a whole. It is hereby noted that the horizontal wall 10' may be provided with means for a watertight fitting abutment thereof onto the walls of the bulb 110.

It is also possible in a vessel with a conventional bow or with a bulb that the portions of the lateral walls of the duct that retract within the vessel may encounter, as they exit through appropriate slots of the vessel, the fixedly mounted portions of the lateral walls which are connected with the horizontal wall portion and subsequently extend at approximately the level of the waterline corresponding to the unloaded vessel condition. It is even possible that the lateral walls 2, 3 are fully encased within the vessel at the side walls of the bow and they may descend when required to meet the horizontal wall portion 1, the ends of which are equipped with suitable recessions or protrusions allowing a snap fitting of the descending lateral walls 2, 3 therein.

Figure 10A:
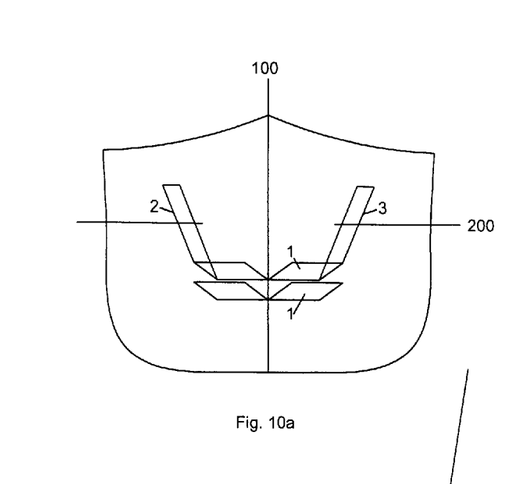
FIG. 10a shows a frontal view of the duct of the invention with an additional blade underlying parallel to the horizontal wall portion and FIG. 10b shows the same arrangement with the gap in between the horizontal wall portion and the additional blade being covered with lateral blades.
Figure 10B:
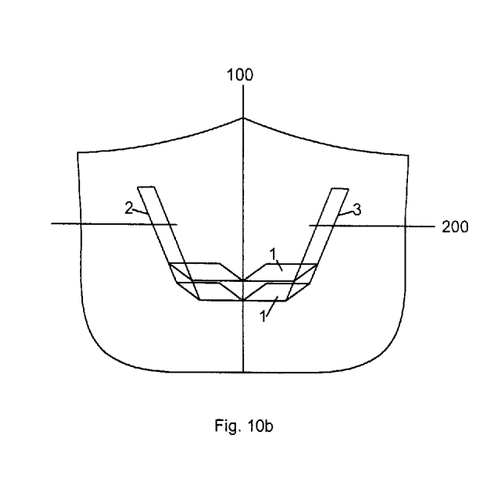

According to another preferred embodiment of the invention, a further object of the invention is to provide an additional one or more wall portions extending horizontally parallel to and underlying the horizontally oriented or inclined wall portion 1 of the duct of the invention. These additional one or more wall portions have the same or different hydrofoil section as the hydrofoil section of the horizontal or inclined wall portion of the duct, wherein the gap in between the horizontal or inclined wall portion 1 and the underlying additional one or more wall portions is either being covered or not covered by lateral walls, wherein the objective of the proposed additional one or more wall portions is to increase the speed of the incoming flow in the duct of the invention and therefore the enhancement of the diversification of flow characteristics within the duct from the surrounding flow. Exemplary illustrations of the aforementioned embodiments are being depicted in FIGS. 10a and 10b, where in particular FIG. 10a shows a frontal view of the duct of the invention with an additional wall portion 1 extending parallel to the overlying horizontal wall portion 1 and FIG. 10b shows the same arrangement with the gap in between the two horizontal wall portions 1 being covered by lateral wall portions having the same or different configuration as the lateral walls 2, 3 of the duct.

Figure 11:
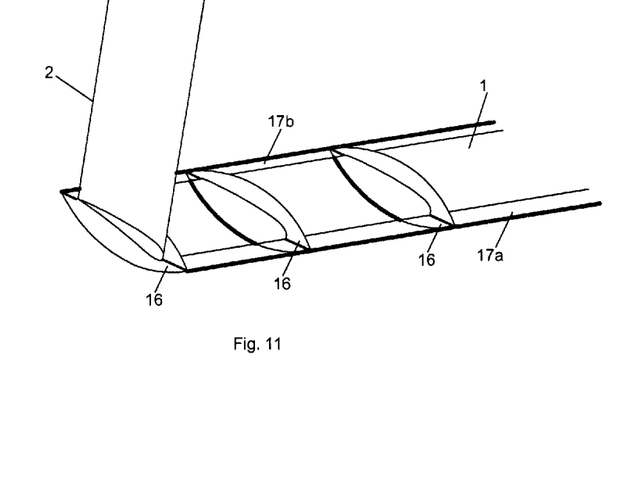
FIG. 11 illustrates an embodiment of the duct of the invention with the horizontal wall portion being provided with protruding ribs comprising slots through which sheet laminates may protrude outwardly contributing in controlling the vessel's displacement in the vertical direction.

FIG. 11 illustrates a further embodiment of the invention with the horizontal wall portion 1 being provided with protruding ribs 16, which on the one hand provide a reinforcement of the horizontal wall portion 1 and on the other hand serve as guides for the extraction through slots provided onto the horizontal wall portion 1 of sheet laminates 17a, 17b protruding outwardly the leading edge and the trailing edge of the hydrofoil section of the horizontal wall portion 1 respectively when required with a scope of providing a further control of the flow acceleration vectors and of appropriately positioning the lift coefficient $C_L$ in the newly adopted geometry of the horizontal wall portion thereby contributing in optimizing the flow characteristics within the duct, wherein such retraction or extraction of sheet laminates 17a, 17b may be accomplished by means of appropriate mechanisms provided in the vessel of the invention.

The invention claimed is:

1. A vessel with a hydrodynamic duct for flow management at a bow thereof, comprising a duct having a horizontal wall portion extending on either side of a frontal edge of the bow and a pair of lateral walls connected at ends of said horizontal wall portion and extending upwardly, said pair of lateral walls having one lateral wall on each side of the bow, wherein water flow within said duct is differentiated from water flow outside said duct, wherein the bow is defined as having longitudinally extending rectilinear side walls on either side of a central axis of symmetry of the vessel, said rectilinear side walls extending vertically upwardly exhibiting a flare relative to a vertical direction;

said duct being displaceable in said vertical direction between an upper end position and a lower end position of said horizontal wall portion thereof, and said pair of lateral walls being configured so that, in any position taken by a vertically displaceable horizontal plane passing through the waterline, the horizontal section of said pair of lateral walls follows the flare of the bow with the trailing edge of a horizontal section of said pair of lateral walls being maintained at a constant equal distance from said rectilinear side walls of the bow, wherein said distance from said rectilinear side walls of the bow is being defined by a perpendicular to said rectilinear side walls of the bow taken from the trailing edge of said horizontal section of said pair of lateral walls that is configured to correspond to waterline.

2. The vessel with a hydrodynamic duct for flow management at the bow according to claim 1 wherein, a bulb is fitted at the bow said bulb extending upwardly up to or close to the waterline and a flow stagnation point onto said bulb lies within the flow stream passing through said duct, side walls of said bulb on either side of said axis of symmetry of the vessel being rectilinear in the longitudinal direction of the vessel, and said pair of lateral walls being configured in a direction parallel to said side walls of said bulb and thereafter parallel to said rectilinear side walls of the bow of the vessel.

3. The vessel with a hydrodynamic duct for flow management at the bow according to claim 1, having a pair of plates wherein said pair of plates respectively correspond to the bow of the vessel with said rectilinear side walls extending in the longitudinal direction of the vessel, said pair of plates covering a length of said horizontal wall portion of said duct in the longitudinal direction of the vessel and is adapted to move together with said horizontal wall portion of said duct ensuring a watertight fitting thereof onto said rectilinear side walls of the bow.

4. The vessel with a hydrodynamic duct for flow management at the bow according to claim 1, wherein said horizontal wall portion is further defined as having chambers filled with either a fluid medium or solid fixtures said chambers or solid fixtures being installed either within said horizontal wall portion abutting said rectilinear side walls of the bow or onto said rectilinear side walls of the bow abutting ends of said horizontal wall portion.

5. The vessel with a hydrodynamic duct for flow management at the bow, according to claim 1, wherein a pair of plates respectively corresponds to the bow with said rectilinear side walls extending in the longitudinal direction of the vessel and chambers filled with a fluid medium or solid fixtures, said pair of plates covering a first portion of the length of said duct in the longitudinal direction of the vessel and said chambers or solid fixtures are installed along a second portion of the length of said duct in the longitudinal direction of the vessel.

6. The vessel with a hydrodynamic duct for flow management at the bow, according to claim 1, wherein said horizontal wall portion of said hydrodynamic duct is oriented in relation to said axis of symmetry of the vessel at a horizontal level perpendicularly oriented to said axis of symmetry with a leading edge of said horizontal wall portion being oriented perpendicularly to said axis of symmetry and with a trailing edge of said horizontal wall portion being oriented perpendicularly to said axis of symmetry of the vessel.

7. The vessel with a hydrodynamic duct for flow management at the bow, according to claim 1, wherein, said pair of lateral walls of said duct are being configured to lie close to the waterline as long as the vessel is stationary in a port; said pair of lateral walls have hydrofoil sections or internal curved or rectilinear sheet laminates wherein said hydrofoil sections are further defined as having the appropriate dimensions and configuration so as to cover said pair of lateral walls and being configured to vertically slide so that said pair of lateral walls may lie close to the waterline as long as the vessel is stationary in a port and said pair of lateral walls may lie sufficiently above the waterline during navigation; said internal curved or said rectilinear sheet laminates are further defined as protruding outwardly during navigation of the vessel and extending vertically above said pair of lateral walls to ensure the differentiation of said water flow within the duct, whilst said internal curved or said rectilinear sheet laminates retract inwardly as long as the vessel is stationary in a port.

8. The vessel with a hydrodynamic duct for flow management at the bow, according to claim 1, which further comprises:

slots on either side along said rectilinear side walls of the bow, wherein portions or the entire length of said pair of lateral walls are configured to retract within said slots, wherein said pair of lateral walls may protrude outwardly from said slots and wherein said slots are adapted to provide retraction within the vessel of said horizontal wall portion.

9. The vessel with a hydrodynamic duct for flow management at the bow, according to claim 1, said horizontal wall portion and said at least one additional wall portion having a hydrofoil section which is provided with sheet metal plates or blades on either side of said horizontal wall portion and said at least one additional wall portion thereof, said sheet metal plates or blades extending underneath said horizontal wall portion and said at least one additional wall portion and converging towards the bow of the vessel.

10. The vessel with a hydrodynamic duct for flow management at the bow, according to claim 1, wherein said horizontal wall portion of said hydrodynamic duct is oriented in relation to said axis of symmetry of the vessel at an angle upwardly with respect to the waterline on either side of said axis of symmetry of the vessel or at an angle downwardly with respect to the waterline on either side of said axis of symmetry of the vessel.

11. The vessel with a hydrodynamic duct for flow management at the bow, according to claim 1, wherein the leading edge of said horizontal wall portion forms a first angle on either side of said axis of symmetry of the vessel and the trailing edge of said horizontal wall portion forms a second angle on either side of said axis of symmetry of the vessel, said first angle being either equal to or different than said second angle, wherein said horizontal wall portion extends upwardly to form a third angle or downwardly to form a fourth angle with respect to the waterline of either side of said axis of symmetry of the vessel.

12. The vessel with a hydrodynamic duct for flow management at the bow, according to claim 1, wherein said horizontal wall portion of said duct extends at a certain inclination of an angle upwardly with respect to the horizontal plane of the waterline or downwardly with respect to the horizontal plane of the waterline on either side of the centerline of the vessel.

13. The vessel with a hydrodynamic duct for flow management at the bow, according to claim 1, wherein said duct is further defined as having at least one additional wall portion extending horizontally, parallel to and underlying said horizontal wall portion, said at least one additional wall portion having a hydrofoil section which is the same or different to the hydrofoil section of said horizontal wall portion of said duct.

14. The vessel with a hydrodynamic duct for flow management at the bow, according to claim 13, wherein said horizontal wall portion and said at least one additional wall portion are provided with protruding ribs, which extend in the longitudinal direction of the vessel, said protruding ribs providing a reinforcement of said horizontal wall portion and serving as guides for the extraction through said slots provided onto said horizontal wall portion of sheet laminates protruding outwardly from a leading edge and from a trailing edge of a hydrofoil section of said horizontal wall portion respectively.

15. The vessel with a hydrodynamic duct for flow management at the bow, according to claim 13, wherein a gap in between said horizontal wall portion and said at least one additional wall portion is either partially or entirely being covered by said pair of lateral walls.

16. A vessel with a hydrodynamic duct for flow management at a bow thereof, comprising a duct having a horizontal wall portion extending on either side of a frontal edge of the bow and a pair of lateral walls connected at ends of said horizontal wall portion and extending upwardly, said pair of lateral walls having one lateral wall on each side of the bow, wherein water flow within said duct is differentiated from water flow outside said duct, wherein the bow is defined as having longitudinally extending convex side walls on either side of a central axis of symmetry of the vessel, said convex side walls extending vertically upwardly exhibiting a flare relative to a vertical direction;

said duct being displaceable in said vertical direction between an upper end position and a lower end position of said horizontal wall portion thereof, and said pair of lateral walls being configured so that, in any position taken by a vertically displaceable horizontal plane passing through the waterline, the horizontal section of said pair of lateral walls follows the flare of the bow with the trailing edge of a horizontal section of said pair of lateral walls being maintained at a constant equal distance from said convex side walls of the bow, wherein said distance from said convex side walls of the bow is being defined by a perpendicular to said convex side walls of the bow taken from the trailing edge of said horizontal section of said pair of lateral walls that is configured to correspond to waterline.

* * * * *